United States Patent [19]

Bramley

[11] Patent Number: 4,876,692
[45] Date of Patent: Oct. 24, 1989

[54] MICROWAVE-PUMPED ATOMIC GAS LASER

[75] Inventor: Jenny Bramley, Falls Church, Va.

[73] Assignee: The United States of America as represented by the Secretary of the Army, Washington, D.C.

[21] Appl. No.: 362,419

[22] Filed: Mar. 26, 1982

[51] Int. Cl.$^4$ ............................................. H01S 3/09
[52] U.S. Cl. ......................................... 372/70; 372/56; 372/57; 372/55
[58] Field of Search ....................... 372/70, 82, 56, 57, 372/69, 55

[56] References Cited

U.S. PATENT DOCUMENTS

| | | | |
|---|---|---|---|
| 3,493,845 | 2/1970 | Bramley | 372/82 |
| 4,229,711 | 10/1980 | Schimitschek et al. | 372/57 |
| 4,230,995 | 10/1980 | Burnhan | 372/57 |
| 4,249,143 | 2/1981 | Eden | 372/57 |

OTHER PUBLICATIONS

Mendelsohn et al, "A Microwave-Pumped XeCl* Laser", *Appl. Phys. Lett.*, 38(8), 15 Apr. 1981, pp. 603–605.

Primary Examiner—James W. Davie
Attorney, Agent, or Firm—Milton W. Lee; Aubrey J. Dunn; Anthony T. Lane

[57] ABSTRACT

Apparatus and method for producing laser radiation from an element of a binary (or more complex) compound pumped by microwave energy. The energy causes the compound to dissociate and for the one element of the compound to go to its first excited state, this state being metastable. As the element emits radiation, it reverts to its ground state and recombines to form a compound (which may be the original compound) capable of being dissociated by the microwave energy and repeating the process.

3 Claims, 1 Drawing Sheet

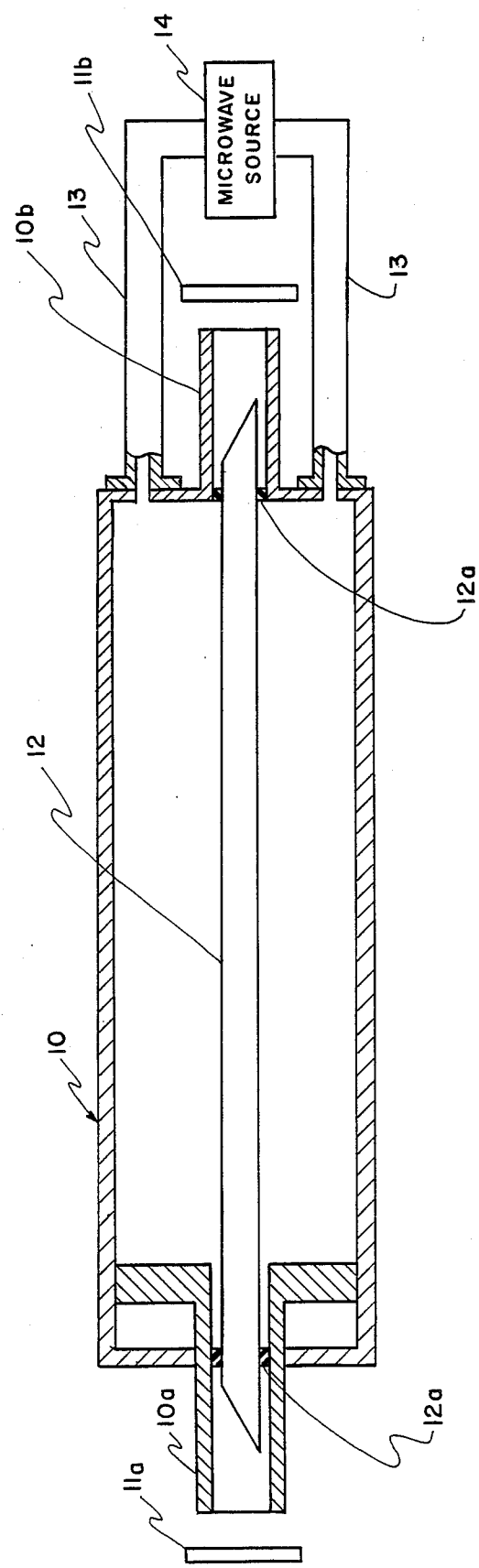

MICROWAVE-PUMPED ATOMIC GAS LASER

The invention described herein may be manufactured, used and licensed by the U.S. Government for governmental purposes without the payment of any royalties thereon.

BACKGROUND OF THE INVENTION

This invention is in the field of lasers, and is particularly concerned with those lasers using gases as their active mediums. Gas lasers are known in the art with various gases and various pumping methods for these gases. For example, cabon dioxide and neon-helium are typical gases; electrical discharges through the gases and high frequency electromagnetic waves applied to the gases are typical pumping methods. My own contributions to the field of light sources including lasers are those inventions shown in U.S. Pat. Nos. 3,374,393 of Mar. 19, 1968 and 3,493,845 of Feb. 3, 1970. These patents deal with microwave pumping of a plasma to produce respectively incoherent and coherent radiation. The coherent radiation is produced when the first excited state of the atoms of the radiation emitting element is metastable, and with the atoms in a suitable structure.

SUMMARY OF THE INVENTION

The invention is an apparatus for and a method of producing laser radiation. The method may be practiced in an apparatus which includes a microwave cavity with a discharge tube therein, a microwave source coupled to the microwave cavity, and a compound in the discharge tube which is dissociated by microwave energy, and a conventional laser mirror arrangement external to the microwave cavity. The method includes the steps of enclosing the compound and a buffer gas or gases in the microwave cavity and pumping it with microwave energy to cause dissociation. When the compound dissociates, at least one element of the compound goes to a metastable first excited state. When the atoms of the element emit radiation, they fall to their ground state and recombine to form a compound which is excitable by the microwave energy to again dissociate and to repeat the process.

BRIEF DESCRIPTION OF THE DRAWING

The sole FIGURE is a simplified schematic diagram of the major components of the apparatus.

DESCRIPTION OF THE PREFERRED EMBODIMENT

The invention might be best understood when this description is taken in conjunction with the drawing. Reference numeral 10 designates a metal housing or enclosure with end pieces 10a and 10b, with laser mirrors 11a and 11b closely adjacent to 10a and 10b (one mirror being partially transmissive). Housing 10 defines a microwave cavity, and contains sealed discharge tube 12 with transparent Brewster angle ends for a compound to be dissociated. Discharge tube 12 also contains a buffer gas or mixture of gases and is supported in end pieces 10a and 10b by seal and support rings 12a. Connected to housing 10 are waveguides 13 from microwave source 14.

The method of the invention proceeds as follows: The discharge tube 12 containing at least a binary compound of the element which is to act as the laser active material is placed in housing 10, and microwave pumping is commenced. The compound in 12 is heated and dissociated such that at least one of its elements goes to its first metastable state. As this element reverts to its ground state, it emits radiation and recombines to form a compound (which may be the original compound) which may be dissociated by the microwave energy to go to its first metastable state and repeat the process.

A particular compound which may be used to practice the invention is anhydrous $MgCl_2$ (magnesium chloride), with $N_2$ (nitrogen) and Xe (xenon) mixture as the primary components of the buffer gas. The $MgCl_2$ is made up as prefused hardened cylinder inside 12 or may be loose crystals. Discharge tube 12 may be made of fused quartz or alumina or similar material with the buffer gas approximately 10% Xe/90% $N_2$ at 5 torr. Microwave source 14, which provides the microwave radiation, may be S-band radiation at 2450 Mhz. Other microwave frequencies may be suitable, with appropriate cavities.

Although not shown, it should be understood that housing 10 will have means for tuning the microwave cavity to resonance. Moreover, at least one of mirrors 11a and 11b is adjustable, for tuning the optical path length.

I claim:

1. A method of obtaining coherent optical or quasi-optical radiation from a chemical element whose first excited state is metastable, including the steps of:
    enclosing a solid compound containing said element in a gas-tight enclosure containing a buffer gas or mixture of gases;
    placing said enclosure in a microwave cavity and between laser mirrors; and
    pumping said compound with microwave radiation to dissociate the said element from the compound, whereby said element goes to its first excited state and whereby the optical or quasi-optical radiation is emitted by said element as it falls to its ground state and recombines with at least one element of said compound to form a compound which may be excited by the microwaves to again dissociate and to repeat the process.

2. A system for producing coherent optical or quasi-optical radiation comprising as the radiating element a solid compound containing at least an element whose first excited state is metastable, wherein said compound is enclosed in a gas-tight enclosure between laser mirrors and with a buffer gas or mixture of gases in the enclosure, and microwave pumping means for dissociating said compound such that said element goes to its first excited state and whereby the optical or quasi-optical radiation is emitted by said element as it falls to its ground state and recombines with at least one element of said compound to form a compound which may be again dissociated to repeat the process.

3. The system as set forth in claim 2 wherein said means for dissociating said compound is a microwave source coupled to a microwave cavity, and whereby said enclosure is contained in said microwave cavity.

* * * * *